US012080003B2

(12) United States Patent
Finley et al.

(10) Patent No.: US 12,080,003 B2
(45) Date of Patent: Sep. 3, 2024

(54) SYSTEMS AND METHODS FOR THREE-DIMENSIONAL NAVIGATION OF OBJECTS

(71) Applicant: Nuvasive, Inc., San Diego, CA (US)

(72) Inventors: Eric Finley, San Diego, CA (US);
Nissim Avitan, San Diego, CA (US);
Justin Smith, San Diego, CA (US);
Yehiel Shilo, San Diego, CA (US)

(73) Assignee: Nuvasive Inc., San Diego, CA (US)

( * ) Notice: Subject to any disclaimer, the term of this patent is extended or adjusted under 35 U.S.C. 154(b) by 338 days.

(21) Appl. No.: 17/760,963

(22) PCT Filed: Sep. 24, 2020

(86) PCT No.: PCT/US2020/052462
§ 371 (c)(1),
(2) Date: Mar. 16, 2022

(87) PCT Pub. No.: WO2021/061960
PCT Pub. Date: Apr. 1, 2021

(65) Prior Publication Data
US 2022/0343518 A1 Oct. 27, 2022

Related U.S. Application Data

(60) Provisional application No. 62/905,370, filed on Sep. 24, 2019.

(51) Int. Cl.
*G06T 7/33* (2017.01)
*G06T 5/50* (2006.01)
*G06T 19/20* (2011.01)

(52) U.S. Cl.
CPC ............... *G06T 7/33* (2017.01); *G06T 5/50* (2013.01); *G06T 19/20* (2013.01);
(Continued)

(58) Field of Classification Search
CPC .. G06T 7/33; G06T 5/50; G06T 19/20; G06T 2207/20081; G06T 2207/30204; G06T 2219/2004; G06T 2219/2016; G06T 2200/04; G06T 2207/10048; G06T 2207/10072; G06T 2207/10116; G06T 2207/10132; G06T 2207/20084; G06T 2207/30012
(Continued)

(56) References Cited

U.S. PATENT DOCUMENTS 7,646,899 B2   1/2010   Fitzpatrick
10,262,424 B2* 4/2019   Ketcha ............. G06T 7/33
(Continued)

FOREIGN PATENT DOCUMENTS

WO   2018/163105 A2   9/2018

OTHER PUBLICATIONS

PCT International Search Report for PCT Application No. PCT/US2020/052462 mailed Jan. 2, 2021 (6 pages).
(Continued)

*Primary Examiner* — Juan A Torres

(57) ABSTRACT

Disclosed herein are systems and methods for registering a first three-dimensional medical image dataset taken with a first image capturing device with a second 3D dataset taken with a second image capturing device.

18 Claims, 11 Drawing Sheets

(52) U.S. Cl.
CPC .............. *G06T 2207/20081* (2013.01); *G06T 2207/30204* (2013.01); *G06T 2219/2004* (2013.01); *G06T 2219/2016* (2013.01)

(58) Field of Classification Search
USPC ......................................................... 382/128
See application file for complete search history.

(56) References Cited

U.S. PATENT DOCUMENTS

| | | | | |
|---|---|---|---|---|
| 10,653,495 | B2* | 5/2020 | Gregerson | G06T 15/20 |
| 10,712,837 | B1* | 7/2020 | Douglas | A61B 5/7425 |
| 11,238,197 | B1* | 2/2022 | Douglas | G16H 20/40 |
| 2017/0000581 | A1* | 1/2017 | Tokuda | G06V 10/40 |
| 2020/0022774 | A1* | 1/2020 | Douglas | A61B 90/37 |

OTHER PUBLICATIONS

PCT Written Opinion for PCT Application No. PCT/US2020/052462 mailed Jan. 2, 2021 (11 pages).

Tokuda et al., "Configurable Automatic Detection and Registration of Fiducial Frames for Device-to-Image Registration in MRI-Guided Prostate Interventions," MICCAI 2013: Medical Image Computing and Computer-Assisted Intervention—MICCAI 2013 pp. 355-362.

Big Data Analytics in the Social and Ubiquitous Context : 5th International Workshop on Modeling Social Media, MSM 2014, 5th International Workshop on Mining Ubiquitous and Social Environments, MUSE 2014, and First International Workshop on Machine Learning for Urban Sensor Data, SenseML 2014, Revised Selected Papers, XP047490695.

\* cited by examiner

Fig. 1A
Fig. 1B
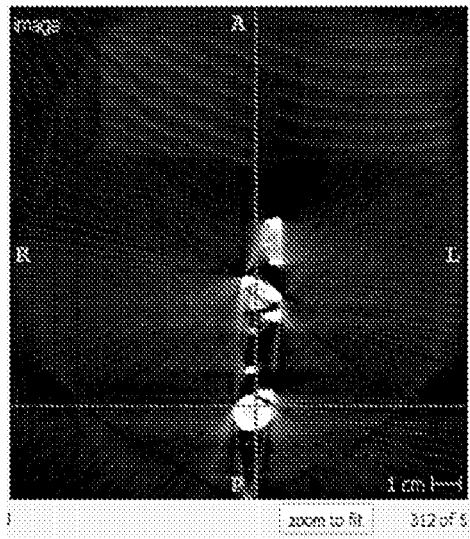
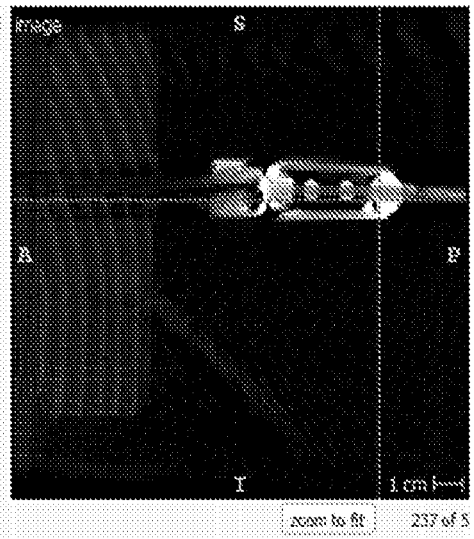
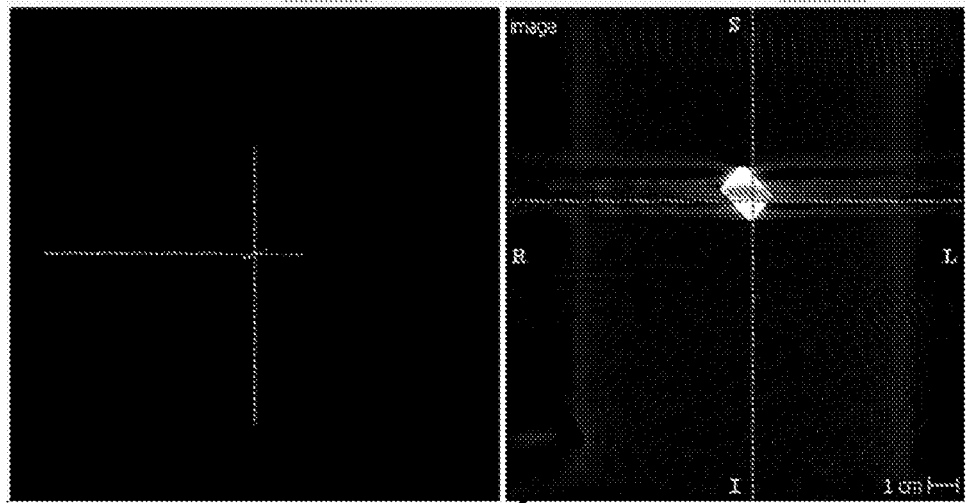
101
Fig. 1C

Fig. 3A
Fig. 3B
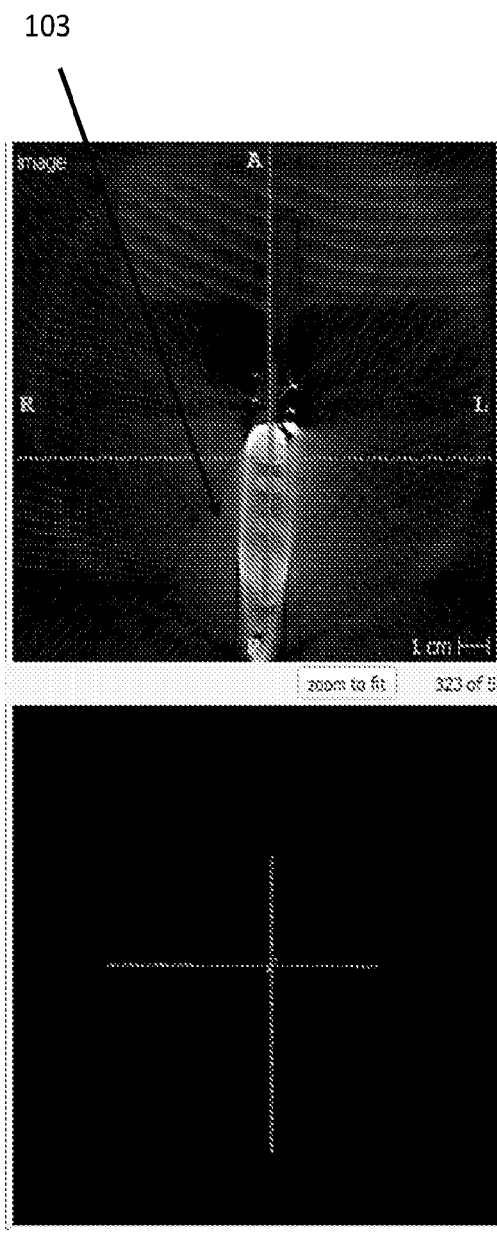
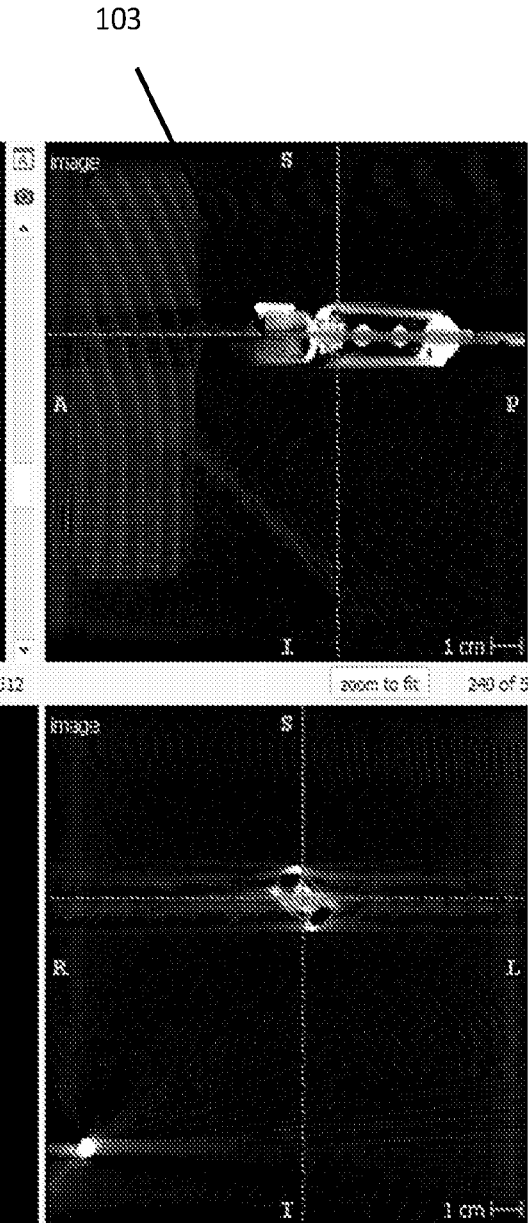
Fig. 3C

SYSTEMS AND METHODS FOR THREE-DIMENSIONAL NAVIGATION OF OBJECTS

CROSS REFERENCE

This application is a National Stage Application of PCT/US2020/052462, filed Sep. 24, 2020, which is a non-provisional of, and claims the benefit of, U.S. Provisional patent application Ser. No. 62/905,370 filed Sep. 24, 2019, the entire contents of which are hereby expressly incorporated by reference into this disclosure as if set forth in their entirety herein.

BACKGROUND

Medical procedures such as minimally invasive surgery (MIS) involve small surgical incisions which reduce surgeon's visualization of patient anatomy and three dimensional (3D) spatial awareness in comparison to traditional "open" techniques. Reduced visualization can lead to reduced location awareness and inaccurate implant placement. Technical challenges of MIS can lead to longer operating room time and/or increased risk of misplaced implants.

SUMMARY

To address technical challenges associated with MIS, surgical navigation systems are implemented in computer assisted surgery or image guided surgery to allow the surgeon to track surgical instruments and use tracking information to directly or indirectly guide the surgical procedure. Surgical navigation systems can use a camera to capture and relay information about the patient's anatomy, and/or position and orientation of the instruments in relation to the patient, for presentation at a digital display, therefore providing fast and accurate feedback to the surgeon's movement during an operation.

The benefits of image-guided surgery using surgical navigation systems may include greater control of the surgical procedure, near real-time feedback on the effect of the intervention, reduced tissue trauma and disruption in gaining access to the anatomical structure. Such image-guided surgery may also allow for: reduced post-operative neural deficits and adverse events. Thus, image-guided surgery using surgical navigation systems can help surgeons perform safer and less invasive procedures and may become a recognized standard of care in managing disorders including cranial, spine, orthopedic, and cardiovascular.

To ensure accurate and reliable functioning of the surgical navigation systems in three dimensions (3D), there is an urgent need for apparatuses and methods that allow accurate 3D registration of the image capturing device and any other imaging devices such as an infrared system and/or 3D scan stitching in order to connect and visualize images taken separately for accurately guiding surgical operations.

Disclosed herein, in some embodiments, are methods for registering a first three-dimensional medical image dataset taken with a first image capturing device with a second 3D dataset taken with a second image capturing device, the method comprising: receiving the first 3D medical image dataset of the anatomical features of the subject with the one or more markers, the first 3D medical image dataset acquired in a first 3D coordinate system using the first image capturing device; receiving the second 3D dataset with the one or more markers, the second 3D medical image dataset in a second 3D coordinate system using the second image capturing device; obtaining prior knowledge of the one or more markers; and finding a plurality of voxel blobs from the first 3D medical image dataset based on the prior knowledge of the one or more markers; clustering the plurality of voxel blobs into a list of clusters of voxels, each of the clusters representing a candidate of the one or more markers; for each cluster of voxels, finding a line passing at least a number of voxels in the cluster; for each cluster of voxels, roughly fitting the cluster to one or more pre-determined marker types with one or more parameters, and fine-tune fitting the cluster to the one or more pre-determined marker types with more than two parameters, thereby generating a corresponding fitting orientation; and finding an optimal registration transformation among a plurality of combinations, wherein each combination includes at least three points in the first coordinate system and corresponding points in the second coordinate system determined by the second image capturing device. In some embodiments, the methods herein further comprises: attaching one or more markers to the anatomical features of the subject; acquiring the 3D medical image dataset of the anatomical features of the subject with the one or more markers in the first 3D coordinate system using the first image capturing device; and acquiring the second 3D dataset with the one or more markers in the second 3D coordinate system using the second image capturing device. In some embodiments, finding the plurality of voxel blobs from the 3D medical image dataset based on prior knowledge of the one or more markers comprises: using a threshold value to select a list of candidates, a binary mask is generated using the threshold value; finding a list of connected candidates optionally using a connected components algorithm; optionally applying one or more filters on the list of connected candidates thereby generating a plurality of voxel blobs. In some embodiments, finding the plurality of voxel blobs from the 3D medical image dataset based on prior knowledge of the one or more markers comprises using a deep learning algorithm. In some embodiments, the deep learning algorithm comprises using a deep learning algorithm to segment a list of candidates; finding a list of connected candidates optionally using a connected components algorithm; and optionally applying one or more filters on the list of connected candidates thereby generating a plurality of voxel blobs. In some embodiments, the line is a main axis of a corresponding cluster. In some embodiments, the one or more parameters comprise an offset of the line and a rotation around the line. In some embodiments, the more than two parameters include six parameters. In some embodiments, the fine-tune fitting includes using a cost function and a weighting. In some embodiments, the method further comprises generating the plurality of combinations, each combination based on one or more candidates of the one or more markers and the corresponding fitting orientations.

In some embodiments, disclosed herein are methods for combining different 3D medical image datasets of a subject, the method comprising: attaching a marker to anatomical features of the subject; acquiring a first 3D dataset of a first part of the anatomical features of the subject with the marker using a first image capturing device; acquiring a second 3D dataset of a second part of the anatomical features of the subject with the marker using the first image capturing device, or a second image capturing device; receiving the first 3D dataset of the first part of the anatomical features of the subject with the marker and receiving the second 3D dataset of the second part of the anatomical features of the subject with the marker, wherein each of the first part of the anatomical features and the second part of anatomical features comprises a overlapped region; aligning the marker of the first 3D dataset with the marker of the second dataset by determining three dimensional translation and two dimensional rotation about a main axis of the marker of the second 3D dataset relative to the first 3D dataset, thereby generating an aligned second 3D dataset; rotating the aligned second 3D dataset about the main axis of the marker in the aligned second 3D dataset until an optimal match between the overlapped region in the aligned second 3D dataset and the overlapped region in the first 3D dataset is detected, thereby generating a rotated second 3D dataset; and generating a combined 3D dataset using the first 3D dataset and the rotated second 3D dataset.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 1A-1C show an exemplary embodiment of the 3D medical image dataset that the systems and methods herein can take as an input, in different views;

FIGS. 3A-3C show an exemplary embodiment of the 3D medical image dataset with a main axis of one marker determined in different views;

DETAILED DESCRIPTION

Figure 2B:
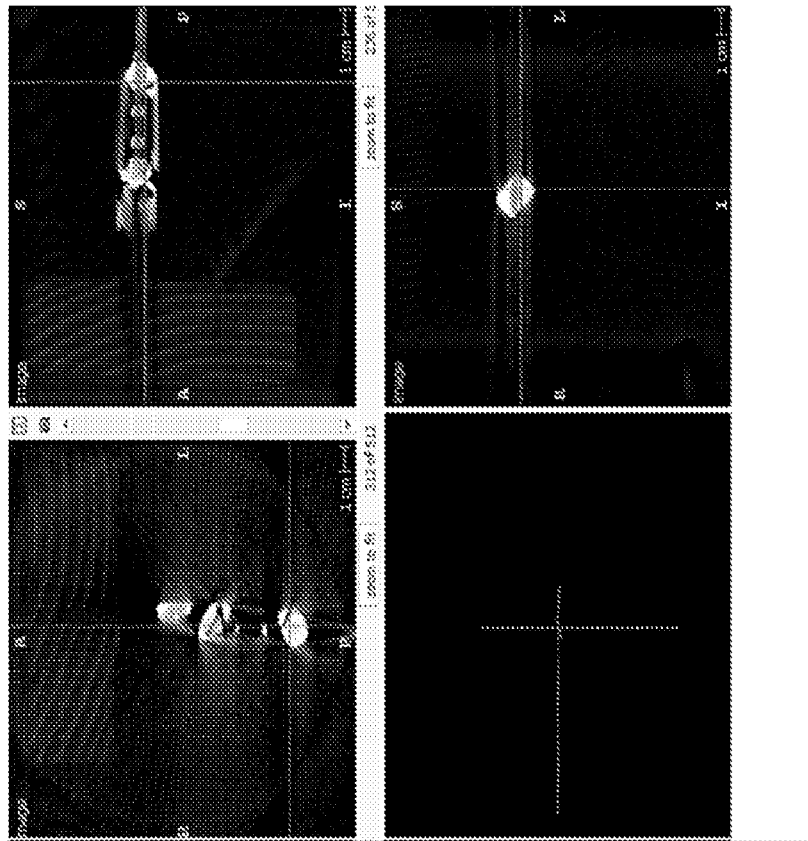
FIGS. 2A-2B show an exemplary embodiment of the 3D medical image dataset in sagittal view (FIG. 2A) with multiple markers attached to different vertebrae, and remain spatially fixed relative to the attached vertebra, and in different views (FIG. 2B) with one marker.

Disclosed herein, in some embodiments, are methods for registering a first three-dimensional medical image dataset taken with a first image capturing device with a second 3D dataset taken with a second image capturing device, the method comprising: receiving the first 3D medical image dataset of the anatomical features of the subject with the one or more markers, the first 3D medical image dataset acquired in a first 3D coordinate system using the first image capturing device; receiving the second 3D dataset with the one or more markers, the second 3D medical image dataset in a second 3D coordinate system using the second image capturing device; obtaining prior knowledge of the one or more markers; and finding a plurality of voxel blobs from the first 3D medical image dataset based on the prior knowledge of the one or more markers; clustering the plurality of voxel blobs into a list of clusters of voxels, each of the clusters representing a candidate of the one or more markers; for each cluster of voxels, finding a line passing at least a number of voxels in the cluster; for each cluster of voxels, roughly fitting the cluster to one or more pre-determined marker types with one or more parameters, and fine-tune fitting the cluster to the one or more pre-determined marker types with more than two parameters, thereby generating a corresponding fitting orientation; and finding an optimal registration transformation among a plurality of combinations, wherein each combination includes at least three points in the first coordinate system and corresponding points in the second coordinate system determined by the second image capturing device. In some embodiments, the methods herein further comprises: attaching one or more markers to the anatomical features of the subject; acquiring the 3D medical image dataset of the anatomical features of the subject with the one or more markers in the first 3D coordinate system using the first image capturing device; and acquiring the second 3D dataset with the one or more markers in the second 3D coordinate system using the second image capturing device. In some embodiments, finding the plurality of voxel blobs from the 3D medical image dataset based on prior knowledge of the one or more markers comprises: using a threshold value to select a list of candidates, a binary mask is generated using the threshold value; finding a list of connected candidates optionally using a connected components algorithm; optionally applying one or more filters on the list of connected candidates thereby generating a plurality of voxel blobs. In some embodiments, finding the plurality of voxel blobs from the 3D medical image dataset based on prior knowledge of the one or more markers comprises using a deep learning algorithm. In some embodiments, the deep learning algorithm comprises using a deep learning algorithm to segment a list of candidates; finding a list of connected candidates optionally using a connected components algorithm; and optionally applying one or more filters on the list of connected candidates thereby generating a plurality of voxel blobs. In some embodiments, the line is a main axis of a corresponding cluster. In some embodiments, the one or more parameters comprise an offset of the line and a rotation around the line. In some embodiments, the more than two parameters include six parameters. In some embodiments, the fine-tune fitting includes using a cost function and a weighting. In some embodiments, the method further comprises generating the plurality of combinations, each combination based on one or more candidates of the one or more markers and the corresponding fitting orientations.

In some embodiments, disclosed herein are methods for combining different 3D medical image datasets of a subject, the method comprising: attaching a marker to anatomical features of the subject; acquiring a first 3D dataset of a first part of the anatomical features of the subject with the marker using a first image capturing device; acquiring a second 3D dataset of a second part of the anatomical features of the subject with the marker using the first image capturing device, or a second image capturing device; receiving the first 3D dataset of the first part of the anatomical features of the subject with the marker and receiving the second 3D dataset of the second part of the anatomical features of the subject with the marker, wherein each of the first part of the anatomical features and the second part of anatomical features comprises a overlapped region; aligning the marker of the first 3D dataset with the marker of the second dataset by determining three dimensional translation and two dimensional rotation about a main axis of the marker of the second 3D dataset relative to the first 3D dataset, thereby generating an aligned second 3D dataset; rotating the aligned second 3D dataset about the main axis of the marker in the aligned second 3D dataset until an optimal match between the overlapped region in the aligned second 3D dataset and the overlapped region in the first 3D dataset is detected, thereby generating a rotated second 3D dataset; and generating a combined 3D dataset using the first 3D dataset and the rotated second 3D dataset.

Disclosed herein, in some embodiments, are A method for combining different 3D medical image datasets of a subject, the method comprising: receiving a first 3D dataset of a first part of the anatomical features of the subject acquired with a marker; and receiving a second 3D dataset of a second part of the anatomical features of the subject with the marker, wherein the first part of the anatomical features and the second part of anatomical features comprises a overlapped region; aligning the marker of the first 3D dataset with the marker of the second dataset by determining three dimensional translation and two dimensional rotation about a main axis of the marker of the second 3D dataset relative to the first 3D dataset, thereby generating an aligned second 3D dataset; rotating the aligned second 3D dataset about the main axis of the marker in the aligned second 3D dataset until an optimal match between the overlapped region in the aligned second 3D dataset and the overlapped region in the first 3D dataset is detected, thereby generating a rotated second 3D dataset; and generating a combined 3D dataset using the first 3D dataset and the rotated second 3D dataset.

Certain Terms

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

3D Datasets

In some embodiments, the systems, methods, and media disclosed herein include a 3D dataset of a subject. The 3D dataset can be taken with any medical imaging modalities. Non-limiting examples of the imaging modalities include CT, MRI, infrared system, ultrasound, (Positron-emission tomography) PET, and (single-photon emission computerized tomography) SPECT. In some embodiments, the 3D dataset may include one or more anatomical features of interest, e.g., a couple of adjacent vertebrae or even the whole spinal cord.

In some embodiments, the 3D dataset includes a plurality of voxels in a coordinate system determined by x1, y1, and z1, the first 3D coordinate system of the first image capturing device, e.g., a C-arm, a CT scanner, etc. The voxel size of the 3D dataset can be varied based on the anatomical structure to be imaged or the imaging modalities. The number of voxels in the x1, y1, z1 directions can also be varied based on the anatomical structure to be imaged and the imaging modalities. As an example, the 3D dataset may include 512 voxels along the x1 and z1 direction corresponding to the left to right and anterior to posterior directions of the patient, respectively, and 2056 pixels along the y1 direction corresponding to the head to foot direction. The voxels may be isotropic or non-isotropic. A length, width, or height of a voxel may be in the range of about 0.1 mm to about 1 cm. The 3D dataset may be in file format such as DICOM, so that the header of the dataset include imaging parameters and positional parameters related to the image.

3D dataset disclosed herein can include one or more markers that are attached to the anatomical features. The position of the marker(s) with respect to the anatomical features remain constant so that the marker(s) can be used as a reference point to align images to the same 3D coordinate system which is the same coordinate system of the second 3D dataset acquired using a second imaging capturing device, e.g., an infrared imaging system. In some embodiment, one or more markers are attached to each anatomical feature of interest.

Image Capturing Devices

The systems, methods, and media disclosed herein include an image capturing device. The image capturing device can be any device that is capable of capturing data that can be used to generate a medical image of the subject. The image capture device can utilize one or more imaging modalities. For example, the image capturing device can include a Radiographic imaging device and an ultrasound imaging device. As another example, the image capture device can be an imaging scanner, such as an X-ray image intensifier or a C-arm. In some embodiments, the image capturing device can include a camera. The camera may utilize visible light, infrared light, other electro-magnetic waves in the spectrum, X-ray, or other sources.

In some embodiments, the image capturing device can include a Siemens Cios Spin machine or a General Electric C-arm.

In some embodiments, the image capturing device is in communication with the systems, methods, and media herein for data communication, or operational control of the image capturing device.

In some embodiments, the image capturing device includes an imaging sensor for detecting signal, e.g., visible light, x-ray, radio frequency (RF) pulses for generating the image(s). In some embodiments, the image capturing device includes one or more software modules for generating images using signal detected at the imaging sensor. In some embodiments, the image capturing device include a communication module so that it communicates data to the system, the digital processing device, a digital display, or any other devices disclosed herein.

In some embodiments, the image capturing device can be a first image capturing device or a second image capturing device.

Anatomical Features

In some embodiments, the 3D dataset include one or more anatomical features that are identical, e.g., a same vertebra. In some embodiments, the anatomical features herein include a plurality of vertebrae. In some embodiments, the anatomical features herein include at least a portion of the spinal cord. In some embodiments, the anatomical features include at least a vertebra of the subject. In some embodiments, the anatomical features of the subject may translation or rotate when the patient moves but the anatomical features may not exhibit any deformable changes when the patient moves. For example, the vertebrae may rotate, translate due to movement, and the vertebrae may also have be removed partly for medical reasons, but the vertebra's general shape and size remain unaltered as the vertebrae are rigid and not flexible when the subject moves. Such characteristics of the vertebrae can be used in the systems, methods, and media disclosed herein.

In some embodiments, the anatomical feature can be any organ or tissue of the subject.

3D Registration

In some embodiments, the systems and methods herein calculates 3D registration between 3D CT scan and the infrared signal detected by the second image capturing device. In some embodiments, the 3D registration is needed in order to navigate the surgical tools accurately in the 3D space. In some embodiments, the 3D scan is obtained after the marker(s) is placed. The exact location and orientation of the marker inside the 3D scan are detected. Such detection may use a deep learning algorithm. In some embodiments, a deep learning algorithm is used to find clusters of voxels, each cluster may represent a marker candidate. The location and orientation of the marker can be used to calculate a transformation matrix between the infrared signal domain and the spatial domain of the 3D scan. The transformation matrix may be a 4 by 4 matrix.

In some embodiments, the 3D registration herein includes a segmentation step which may take the 3D scan, and pre-determined marker type information and generate locations, e.g., coordinates of the fine tuned markers and fitting score of the model of the predetermined marker type to the candidate marker(s) in the scan.

In some embodiments, the 3D registration herein includes a registration step after the segmentation step which takes one or more of: a list of marker candidates; fitting transformation and score to each one of the marker types of each of the list of marker candidates; a second 3D dataset of the tracked markers; and mapping of each tracked marker to its marker type to generate one optimal registration between the first and second coordinate systems; and optionally a numerical value of registration error with unit, e.g., millimeter.

Figure 2A:

In some embodiments, the methods are used for registering a 3D medical image dataset 101 taken with a first image capturing device, as shown in FIG. 1, e.g., CT scanner, with a second 3D dataset taken with a second image capturing device, e.g., infrared imager comprises one or more steps disclosed herein but not necessarily in the order that the steps or operations are disclosed herein. In some embodiments, the method includes attaching one or more markers 102, as shown in FIG. 2A, to anatomical features of a subject so that the markers are fixedly and rigidly attached to the anatomical features, and their location may be used to reliably derive locations of the anatomical features. The markers may be of high intensity than most or almost all anatomical features in the images, as shown in FIGS. 1, 2A-2B. The markers may be metal or contain metal so that they are of high intensity in fluoroscopy images. The methods and systems herein may include acquiring the 3D medical image dataset of the anatomical features of the subject with the one or more markers in a first 3D coordinate system using the first image capturing device and receiving the 3D medical image dataset by the computer for registration. As an example, the 3D dataset is a CT scan as shown in FIG. 1 or a MRI data. The methods and systems may include acquiring the second 3D dataset with at least one or more same markers in a second 3D coordinate system using the second image capturing device, e.g., an infrared position tracking system. The methods or systems herein may also include obtaining prior knowledge of the one or more markers such as shape, size, material, etc. Using the prior knowledge of the markers and, the systems and methods herein can locate a plurality of voxel blobs from the 3D medical image dataset that may be part of the marker(s). In this step, the systems and methods may create a connected components list of candidate voxels, e.g., high intensity voxels in CT scan representing metal markers. In some cases, the systems and methods herein can take the intensity scan and using a minimal intensity value of a metal object to create a list of blobs which represents a metal object. For example, an intensity threshold to the scan with a predetermined value can be applied to create a binary mask. A connected components algorithm can be applied afterwards to have a list of binary voxels with a common connectivity Optionally, a filter based on the size (e.g., number of voxels) of each connected components can be used to filter noise. The output at this step can be a list of candidate voxels blobs 202, as shown in FIGS. 2A-2B.

The identified plurality of voxel blobs can then be clustered into a list of clusters of voxels, each cluster representing one of the markers or a candidate of the marker(s). FIGS. 2A-2B. As a nonlimiting example, for metal markers in CT scans, due to metal artifacts, a single metal body can be split to two or more blobs of high intensity values, this step cluster several blobs to a maximal reasonable cluster in a shape of the know marker, e.g., a long cylinder. In some embodiments, a Random sample consensus (RANSAC) algorithm is used to find the largest cluster each time (in terms of the number of voxels). Then, prior knowledge of the marker can be used to merge blobs, e.g., use a maximal distance between clusters on the cylinder main axis of 20 mm and a maximal radius of 10 mm as a criterion for merging blobs. Optionally, weighting determined by the distance between the new added blob to the current cluster can be added to each newly added blob. The output of this step can be a list of clusters of voxels, each represents a marker candidate.

Alternatively or in combination, a deep learning algorithm can be used. In some embodiments, the systems and methods may utilize vertebra segmentation output as part of its prior knowledge, voxels that represent anatomy can be ignored, a connected components algorithm can be applied to generate a list of binary voxels with a common connectivity. Optionally, filtering on the size (number of voxels) of each connected components may be needed to filter noise. The output of this step can be a list of clusters of voxels, each represents a marker candidate.

For each cluster, the system and methods can find a line passing through at least a number of voxels in the cluster, as shown in FIG. 3. For example, the line is a main axis 103 of each cluster. As another example, the line is a diameter, a diagonal line, a line of symmetry, or the like of each cluster. As an example, for each marker candidate, this step finds the dominant line which pass through the point cloud and best fits as the main axis. The systems and method may perform covariance matrix adaptation evolution strategy (CMAES) optimization in order to find the line (5 degrees of freedom, orientation and position) which minimizes the mean of the points for each slice relative to the line orientation. The clusters that are asymmetric due to noise, artifacts, or missing parts, or markers that are cut-off markers with asymmetrical model shape are also considered in this step. The output of the step can be end points of main axis for each marker candidate.

Figure 4:
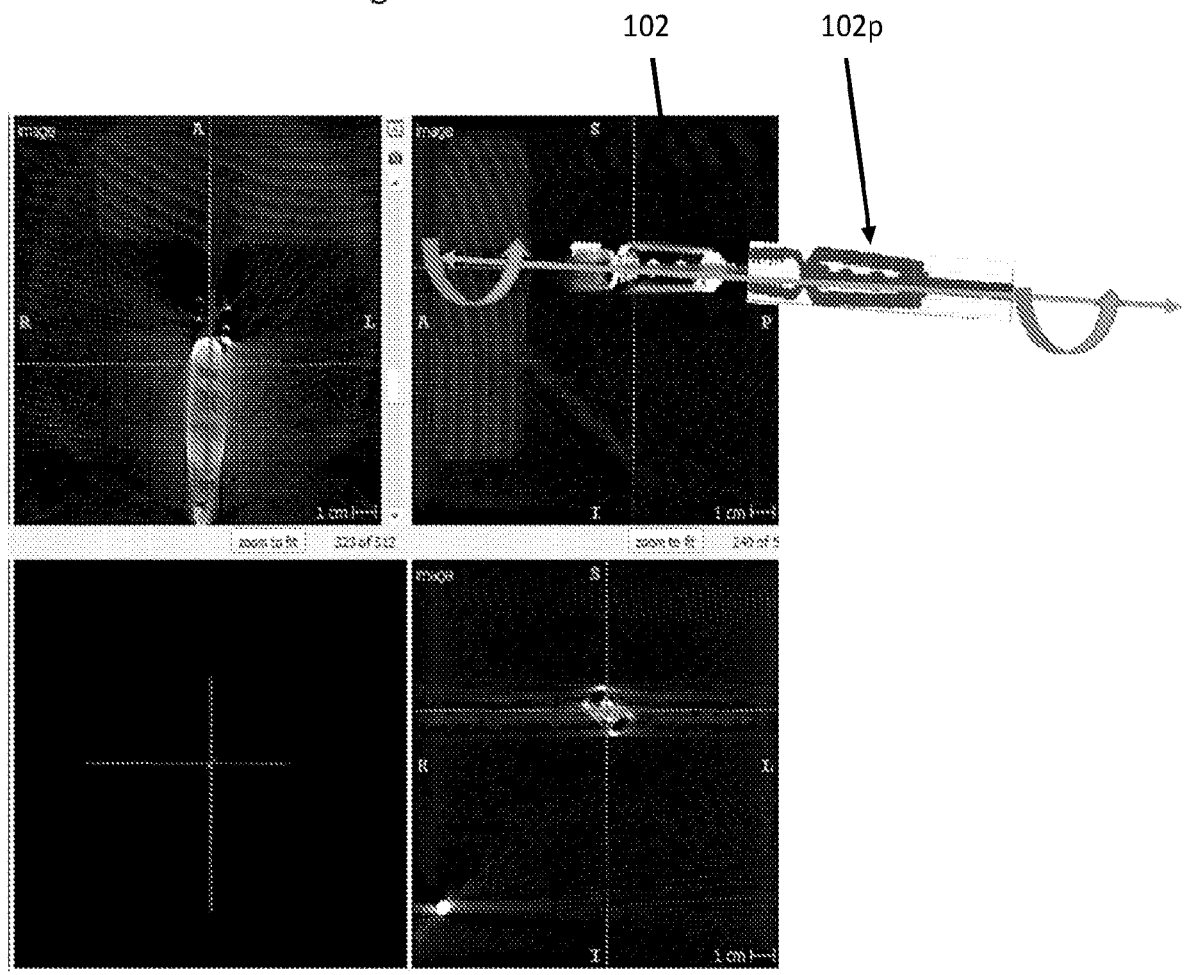
FIG. 4 shows an exemplary embodiment of roughly fitting cluster(s) to one or more pre-determined marker types with two parameters or two degrees of freedom.
Figure 5:
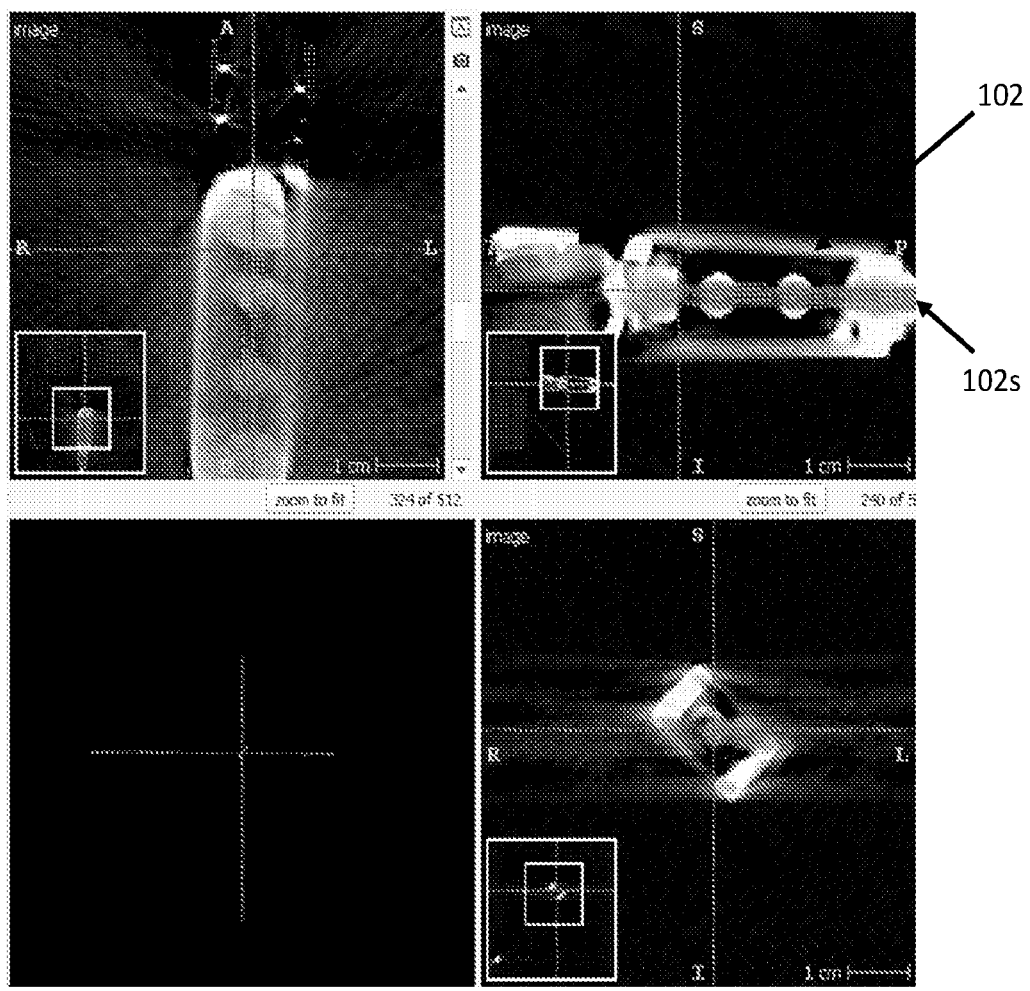
FIG. 5 shows an exemplary embodiment of fine-tune fitting the cluster(s) to the one or more pre-determined marker types with six parameters or six degrees of freedom.

Using information of the cluster, the main axis 103, the prior knowledge of the markers, the second dataset, or a combination thereof, the systems and methods roughly fits the cluster to one or more pre-determined marker types 102p with one or more parameters, e.g., an offset of the line and a rotation around the line, as shown in FIG. 4. The predetermined marker types may be based on the prior knowledge and the second dataset of the markers. After rough fitting, fine-tune fitting of the cluster to the one or more pre-determined marker types can be performed with more than two parameters, e.g., six parameters representing six degrees of freedom. In some cases, fine-tune fitting includes a cost function and a weighting. As an example, rough fitting of each marker model point cloud can be performed with covariance matrix adaptation evolution strategy (CMAES) optimization of two parameters, i.e., offset of the model's main axis along the marker candidate main axis, and self rotation around the main axis. In the same example, fine tune fitting can also be with CMAES optimization but of the whole 6 degrees of freedom of the position and orientation of the model in related to the candidate main axis. FIG. 5 shows exemplary fine-tuned fitting results 102$s$ using CMAES optimization to fit the exact position and orientation. The exemplary cost function can be defined to be the total intensity of the voxels falling in the current pose of the model. A weight factor may be applied to the fitting score. The output of this step, for each marker candidate, can be a list of the best fitting orientation and final fitting score to each marker model optionally selected by user.

Figure 6:
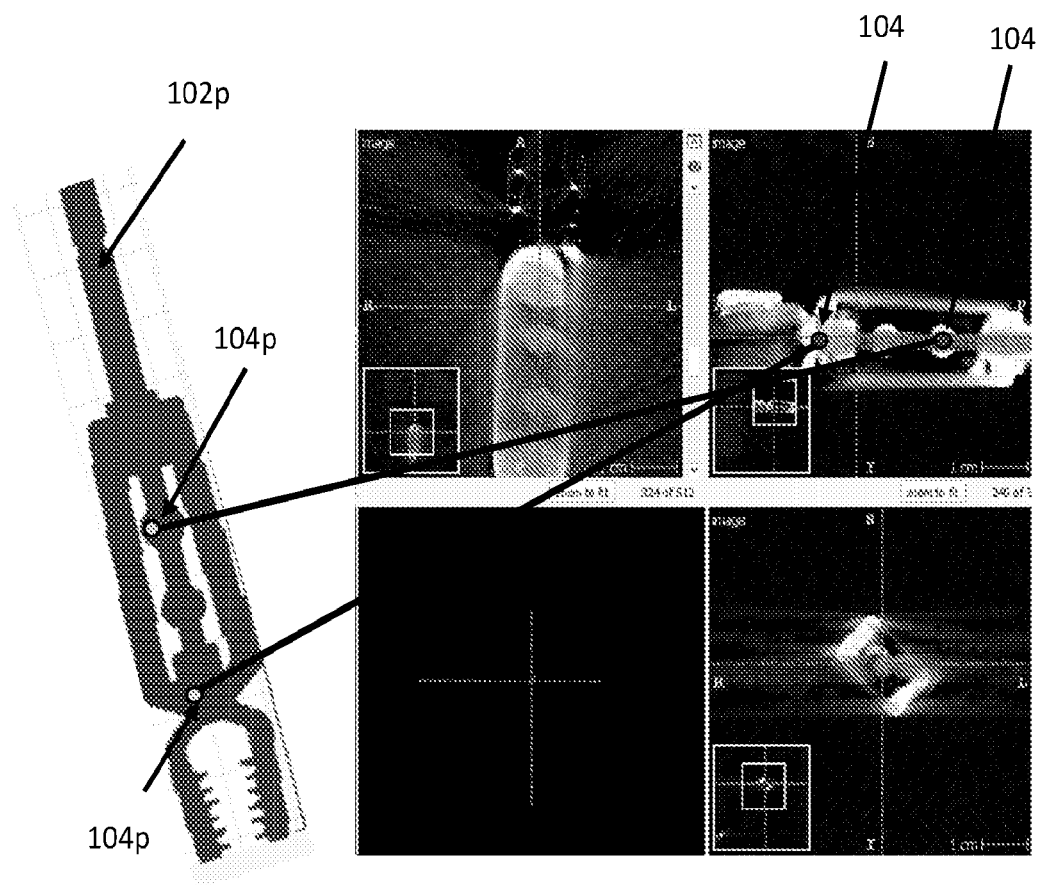
FIG. 6 shows an exemplary embodiment of choosing corresponding points from the segmented cluster(s) from one single marker and from corresponding points of the corresponding marker in the second dataset acquired using a second imaging device, e.g., an infrared system.
Figure 7:
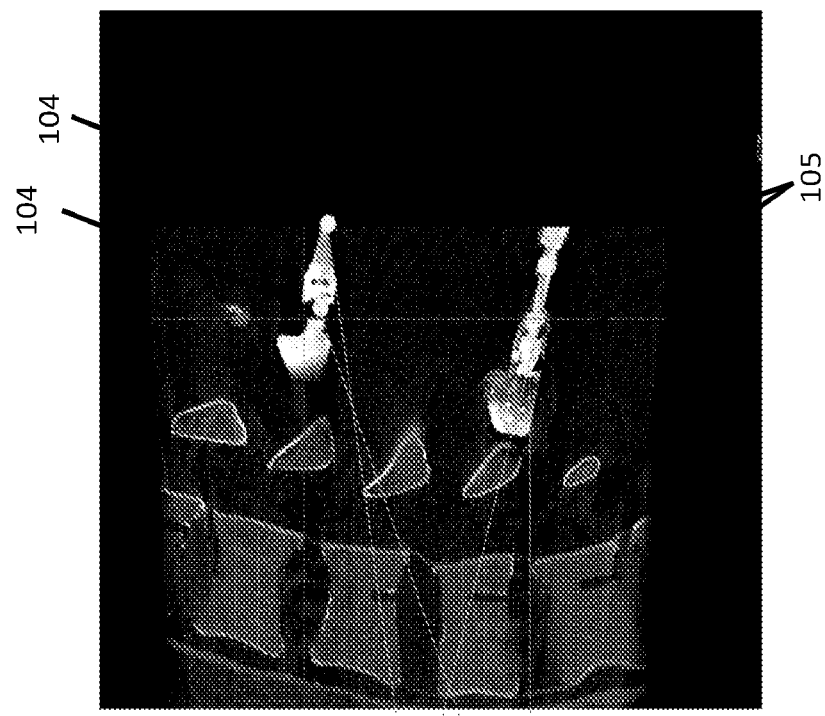
FIG. 7 shows an exemplary embodiment of choosing corresponding points from the segmented cluster from more than one markers and from corresponding points of the corresponding markers in the second dataset acquired using an infrared system for calculating the registration transformation.
Figure 7:
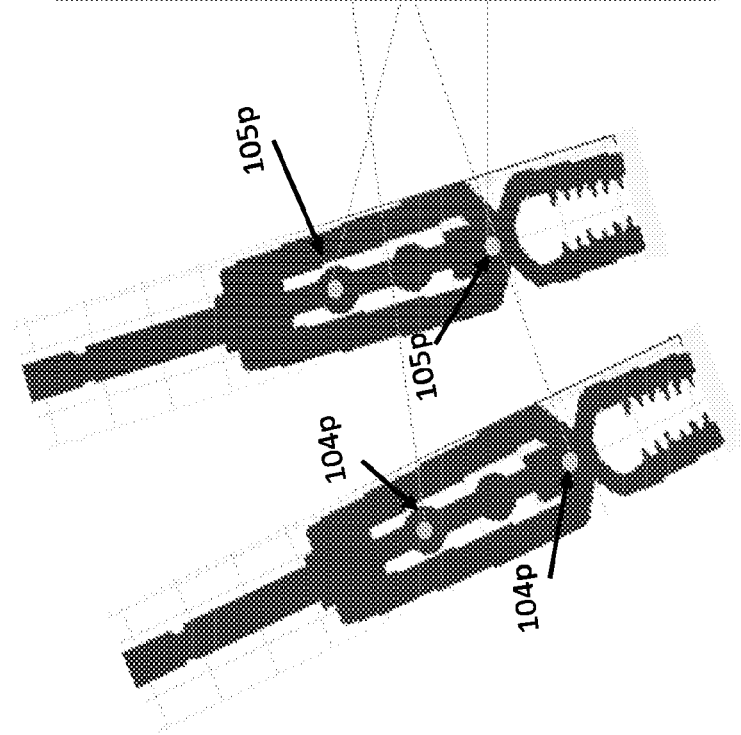

The systems and methods may then find an optimal registration transformation among a plurality of combinations, wherein each combination includes at least three points in the first coordinate system and corresponding points in the second coordinate system determined by the second image capturing device. As an example, the systems and methods can then create multiple combinations of marker candidates from the 3D scan, e.g., CT and marker coordinates from the other coordinate system, e.g., infrared imaging system, and select an optimal combination therefrom. FIG. 6 shows two exemplary corresponding points 104, 104$p$ from the two coordinate systems. FIG. 7 shows an example with 3 points 104, 105, 104$p$, 105$p$ with 6 degrees of freedom or 4 points 104, 105, 104$p$, 105$p$ with 5 degrees of freedom that can be used to calculate rigid transformation between the two different coordinate systems. Each corresponding pair of three or more points in 3D scan and a position tracking system can define a registration transformation with 6 degree of freedom. The projection error can be determined as the maximal distance between two correspondence points from the 3D scan feature points and the transformed position tracking system to 3D scan feature points. In some cases, 3 points from within the marker model as a feature points in both the 3D scan and the position tracking system can be used to calculate the registration transformation with 6 degrees of freedom. In case of only one marker, then the marker candidate with the best fitting score to the marker model is selected. The output can be the best registration transformation and the registration error (or fitting score in case of 6dof marker). In a particular embodiment, the transformation matrix is [−0.93466556, −0.15077823, 0.32197237, 496.46603; 0.041085407, −0.94535697, −0.32343823, −832.67822; 0.35314626, −0.28907824, 0.88978738, 1198.8888; 0, 0, 0, 1], and the registration error is 0.55 mm.

3D Registration without Reference Markers

In some embodiments, disclosed herein are systems and methods for 3D registration based on an image capturing device in the operation room with the patient in the final surgery position. The image capturing device may have the capability of 3D imaging. In some embodiments, the image capturing device includes a flat panel imaging device. In some embodiment, the image capturing device is a mobile C-arm. In some embodiments, the image capturing device is a Siemens Cios Spin device. In some embodiments, the image capturing device takes the 3D images with the related coordinates to a known reference point or coordinate system. In some embodiments, the 3D images can be for direct use in surgical navigation after transferring directly to the navigation system, e.g., Navilink or Navilink 3D. In some embodiments, a reference element, e.g., a reference ring may be attached to the image intensifier. The tracking arrays for navigation can be adapted for compatibility with this reference element.

In some embodiments, a calibration matrix may be calculated, the calibration matrix may provide the relationship between the coordinates of the image capturing device, e.g., mobile C-arm and the image coordinates in space. These image coordinates, and the 3D image datasets may be transferred to the navigation system and yield a direct match with the position of the navigation instruments.

3D Stitching

In some embodiments, medical images has limited field of view, resolution, or image size given the time and cost to obtain the images. As a result, a single image, either in 2D or 3D may not be able to cover the anatomical features of interest. For example, sometimes, it may be difficult to acquire an image of the entire human spine with satisfactory resolution, intensity, contrast etc. Thus, the entire spine may be imaged in more than one images, and such images need to be combined to provide complete and comprehensive information of the anatomical structures. Mistakes in combination of two images may cause inaccuracy in the combined image and such inaccuracy may be propagated surgical tool navigation, surgical movement of the surgeon or any other surgical functions relying on the combined image. As such, there is a need for fast and accurate combination or stitching of two or more medical image datasets.

Figure 8A:
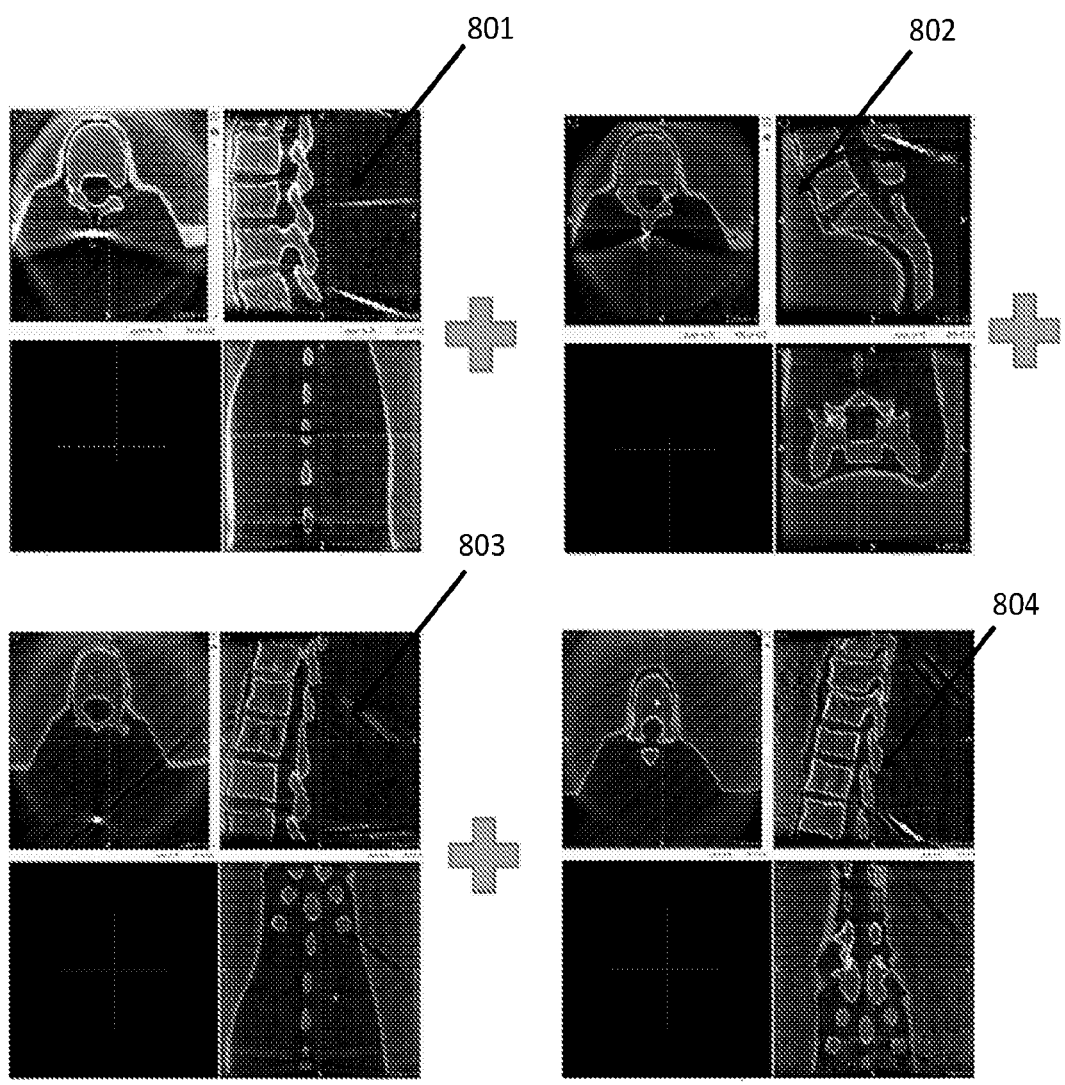
FIGS. 8A-8B show exemplary images before and after 3D stitching using the systems and methods herein.
Figure 8B:
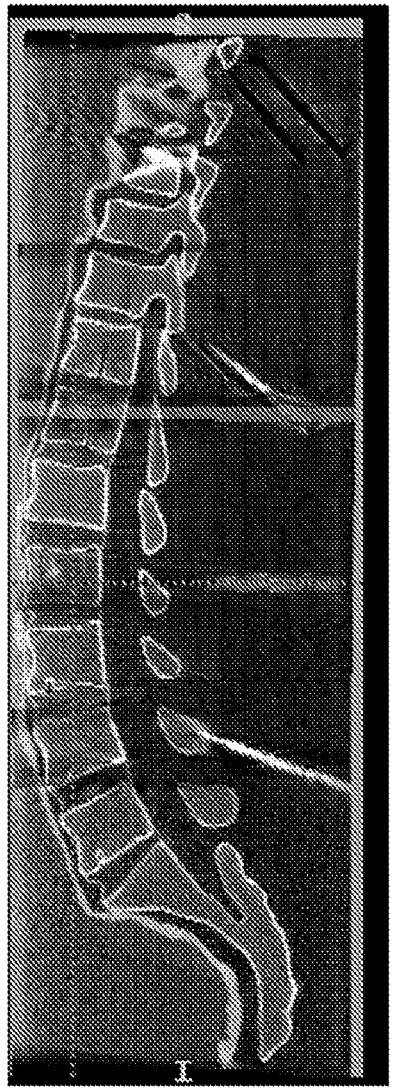
Figure 8B:
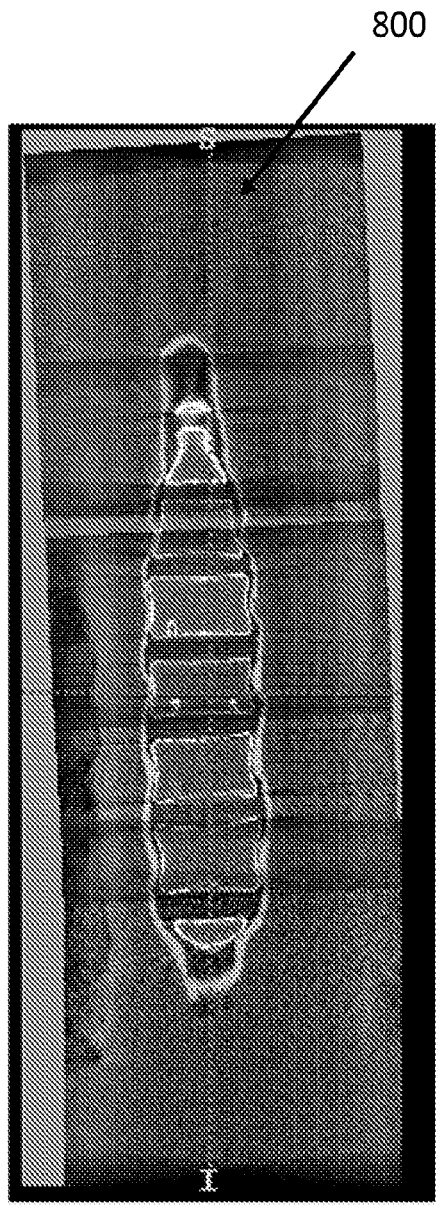
Figure 9A:
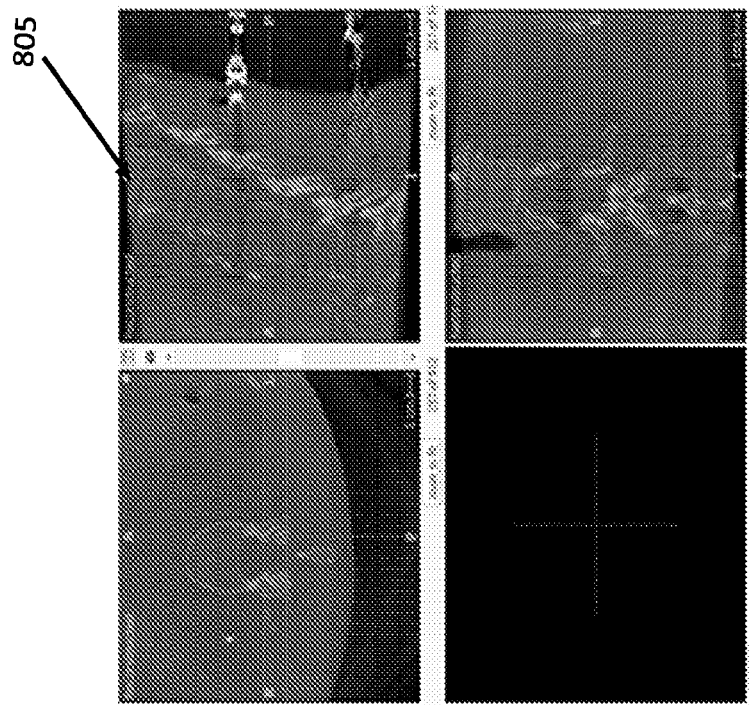
FIGS. 9A-9B show exemplary images before and after 3D stitching using the systems and methods herein.
Figure 9A:
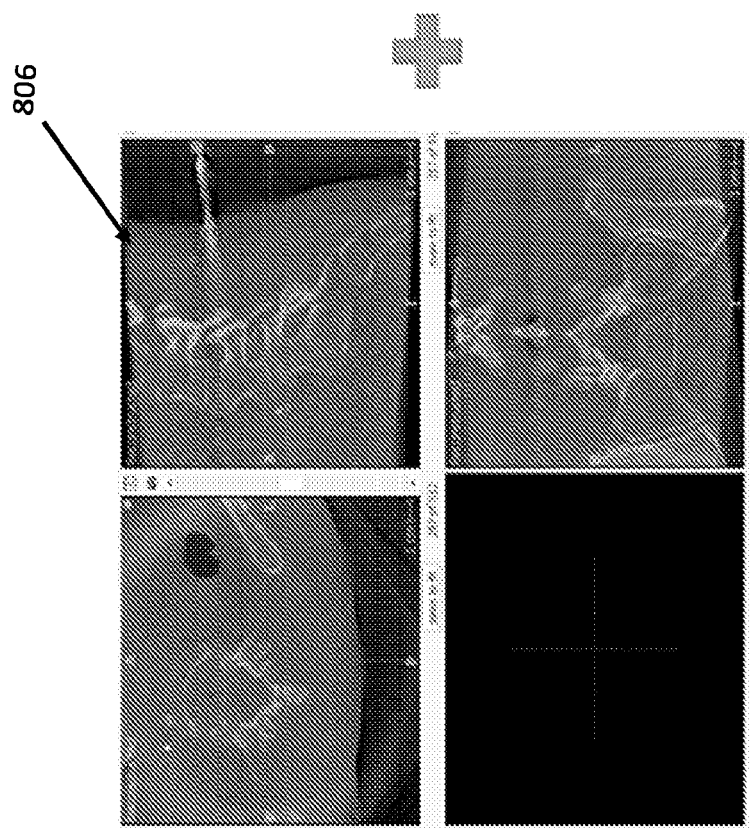
Figure 9B:
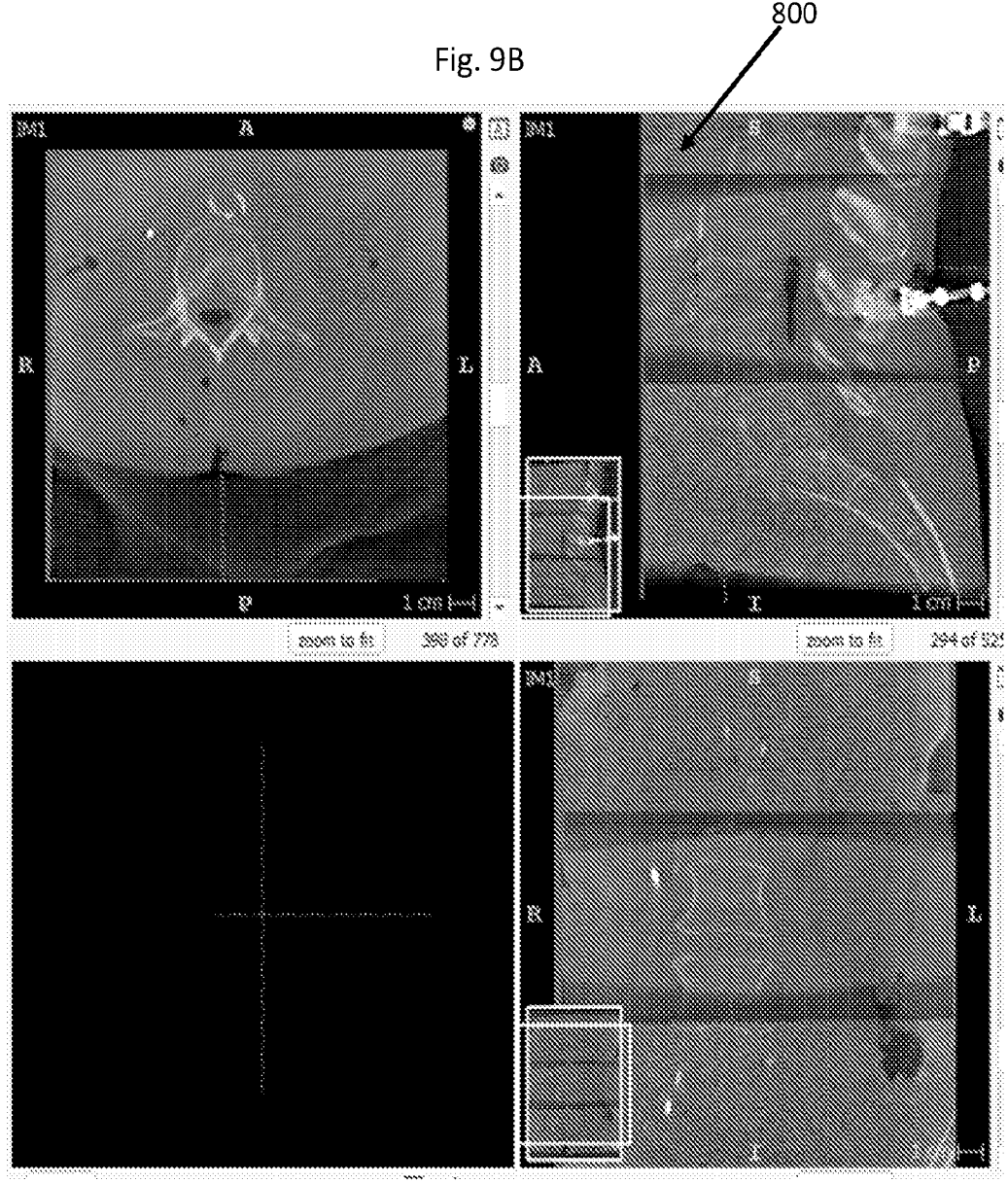

In some embodiments, disclosed herein are systems and methods for combining different 3D medical image datasets of a subject. The systems and methods herein can include one or more method steps or software modules enabling the method steps. The method steps can include attaching a marker to anatomical features of the subject. The position of the marker(s) with respect to the anatomical features remain constant so that the marker(s) can be used as a reference point to align images to the same 3D coordinate system which is the same coordinate system of the second 3D dataset. The marker can be within the region of overlapping so that the same marker is visible in the first and the second dataset. The marker may comprise material that looks different from the anatomical features so that it can be easily and unambiguously identified in the first and second 3D dataset. For example, the marker can be metal markers with or without infrared trackable tracking markers thereon. To simplify the setup and reduce complexity, the marker may be the same marker that can be utilized in other surgical functions, such as 3D registration, 3D navigation, etc. The marker may be any geometrical shape. For example, the marker may be an elongate shape with a symmetric configuration about its longitudinal or main axis as can be seen in FIGS. 8A-8B, and 9A-9B. In FIGS. 8A-8B, 4 different sets of image data 801-804 are stitched together into one dataset, 800. In FIGS. 9A-9B, 2 different datasets 805, 806 are combined into one dataset 800.

The systems and methods herein may acquire a first 3D dataset of a first part of the anatomical features of the subject, e.g., a first portion of a spine, with the attached marker in the field of view using a first image capturing device, e.g., a C-arm and acquire a second 3D dataset of a second part of the anatomical features with the same attached marker in the second field of view either using the same first image capturing device, or another image capturing device. The first and second 3D dataset includes a 3D volume of overlap that appears in both datasets, and the same marker can be within the volume of overlap. One or more additional markers can be in the overlapped volume. The datasets, alone or in combination with imaging parameters, can be sent to a digital processing device for combination. Such imaging parameters include parameters that can help align or combine the two dataset. Non-limiting examples of such imaging parameters include field of view, image size, image resolution, signal to noise ratio, etc.

When the marker is symmetric about its longitudinal axis or main axis, the systems and methods herein can align one of the two datasets with the other one by aligning the same marker that appears in both datasets using translation in three dimensions and rotation in two dimensions. The two rotational dimensions are within a plane perpendicular to the main axis of the marker thereby generating an aligned second 3D dataset. The alignment may be determined using various methods. For example, the alignment may be determined by obtaining a volume of the aligned marker and compare it with the marker in the two datasets. The smaller difference may indicate a better alignment. As another example, the alignment may be calculate a difference between the candidate aligned dataset with one of the dataset, and stop the alignment when the difference of the marker region is satisfactory. An aligned 3D dataset relative to the other dataset can be generated.

Subsequently, to account for the third degree of freedom in rotation, the systems and methods may rotate the aligned 3D dataset about the main axis of the marker in the aligned 3D dataset until an optimal match between the overlapped region in the aligned 3D dataset and the overlapped region in the other 3D dataset is detected, thereby generating a rotated 3D dataset.

Various methods for 3D image comparison or detection of image difference can be used herein.

When the marker is not symmetric about its longitudinal axis or main axis, the systems and methods herein can align one of the two datasets with the other one by aligning the same marker that appears in both datasets using translation in three dimensions and rotation in three dimensions.

After alignment and rotation, the two volumes may be registered to each other with six degrees of freedom to be in a same coordinate system. The two datasets can be used to generating a combined 3D dataset. The combination may be a summation of the two dataset to become a larger 3D volume. Methods and process for equaling intensity and/or contrast in the overlapped volume may be taken if necessary. Methods and process for adjusting the range of image intensity may be taken in the overlapped region. Alternatively, the user may select to use only one or the other dataset's information in the overlapped volume.

FIG. 8A shows four exemplary 3D image volumes 801-804 that needs to be stitched together, each with axial, sagittal, and coronal views. FIG. 8B shows the combined 3D volume 800 of the four datasets shown in FIG. 8A in sagittal and coronal views.

FIG. 9A shows two exemplary 3D image volumes 805, 806 that need to be stitched together, each with axial, sagittal, and coronal views. FIG. 9B shows the combined 3D volume 800 of the two datasets shown in FIG. 8A in sagittal and coronal views.

In some embodiments, anatomical features may be selected to work similarly as the marker(s) disclosed herein.

Such anatomical feature may be non-deformable features such as a spinous process in L5, a transverse process in S1, or any other anatomical features that do not deform during imaging. The systems and methods disclosed herein may use the same number of anatomical features as marker(s) here for 3D stitching. In some embodiments, one may determine multiple sub-features in one anatomical feature, and each of the sub-features may function similarly as the marker(s) disclosed herein for 3D stitching.

Although certain embodiments and examples are provided in the foregoing description, the inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method disclosed herein, the operations may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the systems, and/or devices described herein may be embodied as integrated components or as separate components.

What is claimed is:

1. A method for registering a first three-dimensional (3D) medical image dataset taken with a first image capturing device with a second 3D dataset taken with a second image capturing device, the method comprising:
    receiving first 3D medical image dataset of anatomical features of a subject with one or more markers, the first 3D medical image dataset acquired in a first 3D coordinate system using the first image capturing device;
    receiving the second 3D dataset with the one or more markers, the second 3D medical image dataset in a second 3D coordinate system using the second image capturing device;
    obtaining prior knowledge of the one or more markers;
    finding a plurality of voxel blobs from the first 3D medical image dataset based on the prior knowledge of the one or more markers;
    clustering the plurality of voxel blobs into a list of clusters of voxels, each of the clusters representing a candidate of the one or more markers;
    for each cluster of voxels, finding a line passing at least a number of voxels in the cluster;
    for each cluster of voxels, roughly fitting the cluster to one or more pre-determined marker types with one or more parameters, and fine-tune fitting the cluster to the one or more pre-determined marker types with more than two parameters, thereby
    generating a corresponding fitting orientation; and
    finding an optimal registration transformation among a plurality of combinations, wherein each combination includes at least three points in the first coordinate system and corresponding points in the second coordinate system determined by the second image capturing device.

2. The method of claim 1 comprising:
    attaching one or more markers to the anatomical features of the subject;
    acquiring the 3D medical image dataset of the anatomical features of the subject with the one or more markers in the first 3D coordinate system using the first image capturing device; and acquiring the second 3D dataset with the one or more markers in the second 3D coordinate system using the second image capturing device.

3. The method of claim 1, wherein finding the plurality of voxel blobs from the 3D medical image dataset based on prior knowledge of the one or more markers comprises:
using a threshold value to select a list of candidates, a binary mask is generated using the threshold value;
finding a list of connected candidates optionally using a connected components algorithm;
optionally applying one or more filters on the list of connected candidates thereby generating a plurality of voxel blobs.

4. The method of claim 3, wherein finding the list of connected candidates uses a connected components algorithm; and
wherein finding the plurality of voxel blobs includes:
applying one or more filters on the list of connected candidates.

5. The method of claim 1, wherein finding the plurality of voxel blobs from the 3D medical image dataset based on prior knowledge of the one or more markers comprises using a deep learning algorithm.

6. The method of claim 5, wherein the deep learning algorithm comprises using a deep learning algorithm to segment a list of candidates; finding a list of connected candidates optionally using a connected components algorithm; and optionally applying one or more filters on the list of connected candidates thereby generating a plurality of voxel blobs.

7. The method of claim 1, wherein the line is a main axis of a corresponding cluster.

8. The method of claim 1, wherein the one or more parameters comprise an offset of the line and a rotation around the line.

9. The method claim 1, wherein the more than two parameters include six parameters.

10. The method of claim 1, wherein the fine-tune fitting includes using a cost function and a weighting.

11. The method of claim 1, further comprising generating the plurality of combinations, each combination based on one or more candidates of the one or more markers and the corresponding fitting orientations.

12. The method of claim 1, further comprising:
updating the list of clusters by merging two or more clusters of voxels of the list of clusters using the prior knowledge of the marker.

13. The method of claim 12, wherein the prior knowledge includes a maximum distance between clusters on a main axis; and
wherein the prior knowledge includes a maximum radius.

14. The method of claim 12, further comprising:
using random sample consensus to find a cluster.

15. The method of claim 12, wherein the merging is based on weighting determined by distance between clusters.

16. The method of claim 1, further comprising:
segmenting one or more anatomical features; and
ignoring one or more voxels based on the segmented anatomical features.

17. The method of claim 1, further comprising:
coupling the one or more markers to one or more anatomical features of the subject;
generating the first 3D medical image dataset with the first image capturing device; and
generating the second 3D dataset with the second image capturing device.

18. The method of claim 1, further comprising:
placing an implant after finding the optimal registration transformation.

* * * * *